United States Patent [19]

Ohmura

[11] Patent Number: 5,600,915
[45] Date of Patent: Feb. 11, 1997

[54] HOOD ASSEMBLY FOR A REEL MOUNTING DEVICE

[75] Inventor: Ryuichi Ohmura, Shizuoka-shi, Japan

[73] Assignee: Fuji Kogyo Co., Ltd., Shizuoka-ken, Japan

[21] Appl. No.: 464,353

[22] Filed: Jun. 5, 1995

[30]  Foreign Application Priority Data

Jun. 9, 1994 [JP] Japan .................................. 6-151425

[51] Int. Cl.⁶ .............................................. A01K 87/06
[52] U.S. Cl. ............................................................ 43/22
[58] Field of Search .................................................. 43/22

[56]  References Cited

U.S. PATENT DOCUMENTS 4,045,902  9/1977  Ohmura ...................................... 43/22
4,237,640  12/1980  Sato ........................................... 43/22
4,648,195  3/1987  Kim ............................................ 43/22

*Primary Examiner*—Joseph J. Hail, III
*Assistant Examiner*—Darren Ark
*Attorney, Agent, or Firm*—Evenson, McKeown, Edwards & Lenahan, P.L.L.C.

[57]  ABSTRACT

A reel seat structure in which a lining piece is internally mounted in a fishing reel seat hood. In an assembling step for mounting the assembly to the seat, there is no removal of the lining piece. In addition, the assembling work is easily carried out. Front and back engaging portions of the lining piece are rendered to be laid on an upper surface of the corresponding engaging portion of the hood and is further engaged with the inside of the hood thereby prevent the removal of the lining piece. The back engaging portion is inserted at one position of the top portion of the hood to thereby facilitate the assembling work.

3 Claims, 3 Drawing Sheets

HOOD ASSEMBLY FOR A REEL MOUNTING DEVICE

BACKGROUND OF THE INVENTION

The present invention relates to a reel seat for a fishing rod, and more particularly to a device for mounting a lining piece internally mounted on a hood portion into which a reel foot is inserted.

Japanese Utility Model Application Laid-Open No. Hei 5-43863 shows a reel seat having a structure A which is assembled by providing a lining piece into a hood. In this structure, an engagement means is constructed so that an engagement bore B is formed on an upper portion of the hood, a downwardly projecting edge C is formed at the bore edge, an engagement projection G which is to be inserted into the engagement bore B is formed in the other lining piece D, and a recess groove H for receiving the downwardly projection edge C is formed in the base portion of the lining piece D. However, when the engagement projection G is inserted into the engagement bore B in assembling the hood and the lining piece, the engagement projection G is obstructed by the downwardly projection edge C, resulting in difficulty in assembling. Since the coupling force between the downwardly projecting edge C and the recess groove H is weak, the pull-off of the lining piece D occurs in the assembling work. Accordingly, adhesives or the like are used for assisting the coupling force.

SUMMARY OF THE INVENTION

An object of the present invention is to provide a coupling structure which makes it easy to assemble the hood and the lining piece by improving the engagement structure therebetween, and makes it possible to prevent the pull-off of the lining piece.

According to the present invention, there is provided a reel seat for a fishing rod, characterized in that engaging portions are provided in front and back portions of a hood into which a reel foot is to be inserted and a lining piece internally mounted in the hood, the front and back engaging portions of the lining piece are laid on the front and back engaging portions of the hood, and the back engaging portions of the hood and the lining piece are formed on upper portion.

According to the present invention, the lining piece is inserted from a reel foot insertion side(front) of the hood, the back portion of the lining piece is directed somewhat upwardly, the back engaging portion of the lining piece is rendered to ride on the top surface of the hood back engaging portion, and the front portion of the lining piece is pushed to the inner surface of the hood while further pushing the lining piece, so that the front engaging portion of the lining piece is laid on the front engaging portion of the hood to thereby complete the assembling work.

DESCRIPTION OF THE PREFERRED EMBODIMENTS

The present invention will now be described with reference to the accompanying drawings.

Figure 1:
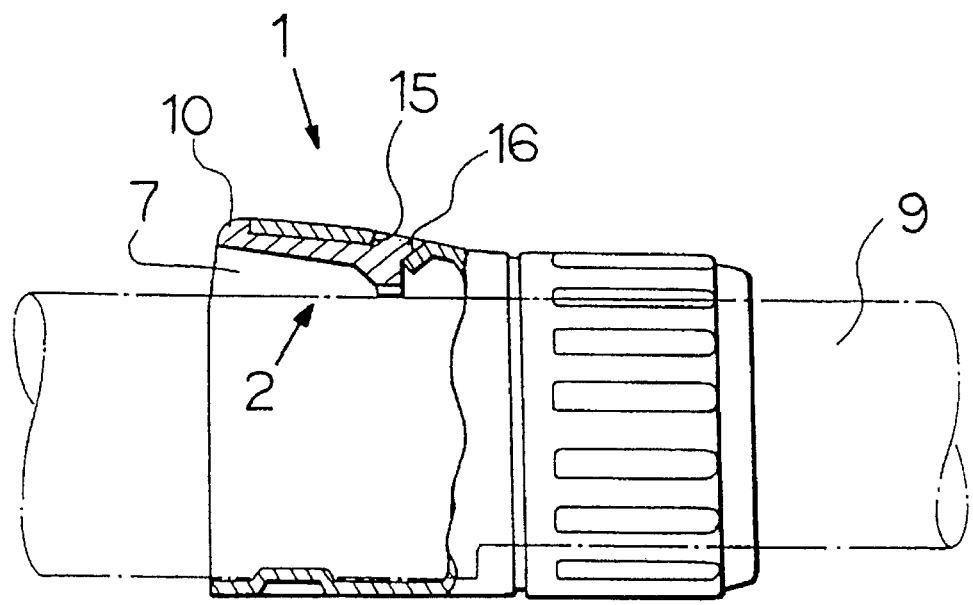
FIG. 1 is a longitudinal sectional view showing a first embodiment.
Figure 2:
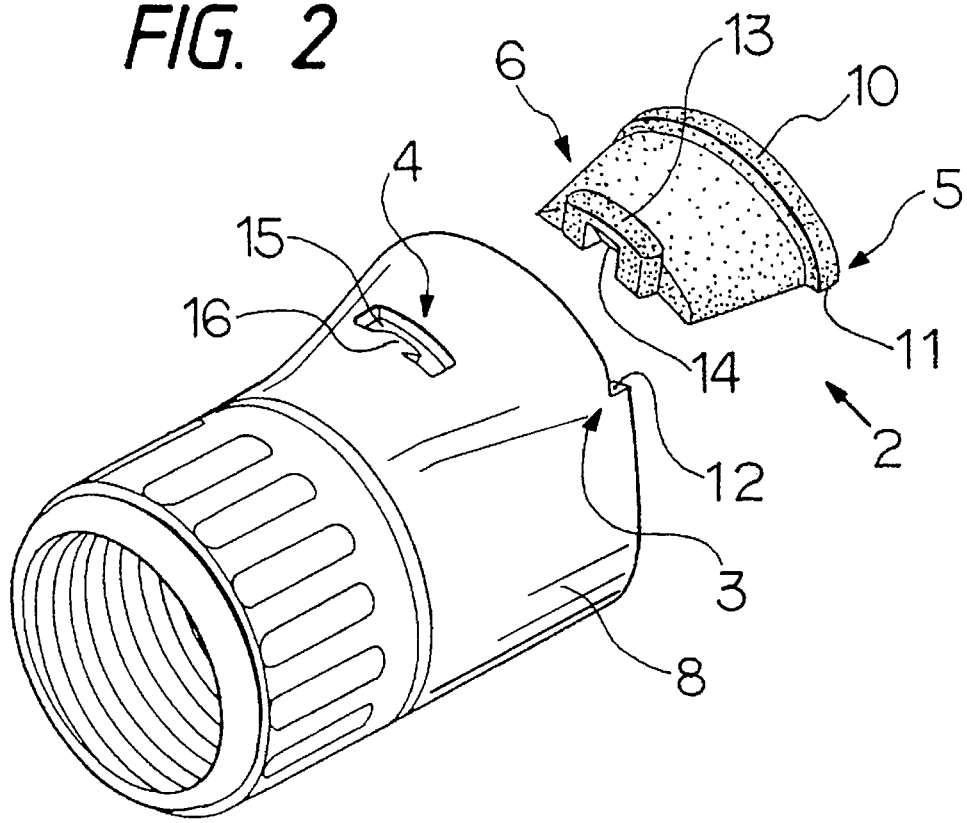
FIG. 2 is an exploded perspective view showing the first embodiment.

FIGS. 1 and 2 show a first embodiment in which a lining piece 2 made of synthetic resin is internally provided in a hood 1 made of metal. These two components are engaged by front and back engaging portions 3 and 4 provided in the front portion and back portion of the hood 1 and front and back engaging portions 5 and 6 provided in the lining piece 2. Reference numeral 7 denotes a cavity for insertion of a reel foot. Reference numeral 8 denotes a cylindrical sleeve portion which serves as a means for mounting the reel seat to the seat body 9. The shape of the cylindrical sleeve portion 8 should be changed depending upon the shape of the seat body 9.

The front engaging portion 5 of the lining piece 2 has right and left bottom ends 11 of the outer flange 10 formed at the front end of the lining piece 2 and is to be laid on steps 12 which are the front engaging portion 3 of the hood 1.

A projection 13 which projects upwardly is formed in the back engaging portion 6 of the lining piece 2. The projection 13 has an inclined surface 14 which is formed in the bottom side and slanted forwardly downwardly. A bore 15 for receiving the projection 13 is provided on the hood 1 side of the back engaging portion 4 and an inclined piece 16 for engaging with the inclined surface 14 is formed in the back side.

For mounting the lining piece 2 onto the hood 1, the lining piece 2 is inserted through an opening of the hood 1, the inclined surface 14 of the back engaging portion 6 is rendered to ride on the inclined piece 16 of the hood 1, then the front portion of the lining piece 2 is pressed against the inner surface of the hood 1 while pushing the lining piece 2 rearwardly so that the right and left bottom ends 11 of the outer flange 10 of the lining piece 2 are laid on the right and left steps 12 formed by cutaway part of the front edge of the hood 1 thereby complete the mounting.

Figure 3:
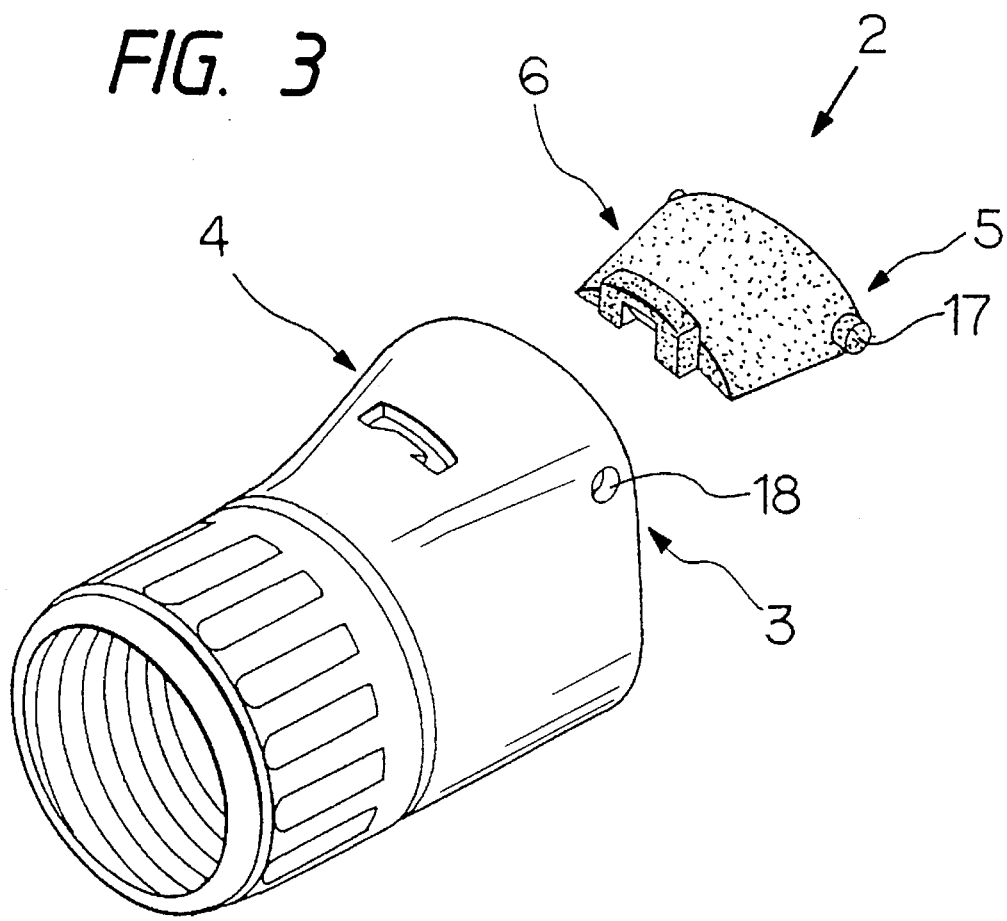
FIG. 3 is an exploded perspective view showing a second embodiment.

In a second embodiment shown in FIG. 3, the front engaging portion 5 of the lining piece 2 is a pair of pegs 17 formed on the right and left side walls, and the front engaging portion of the hood is a pair of drill bores 18 and the same back engaging portions 4 and 6 as those of the first embodiment are used.

Figure 4:
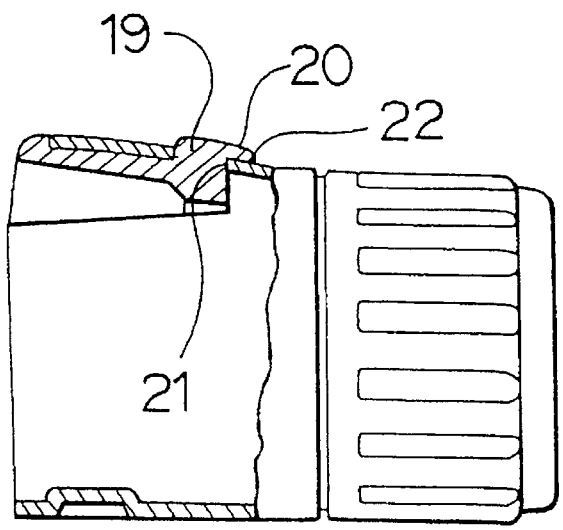
FIG. 4 is a longitudinal sectional view showing a third embodiment.

In a third embodiment shown in FIG. 4, the back engaging portion of the lining piece is a flap 20 extending rearwardly from the upper surface as a bump 19 formed on the back upper surface of the lining piece, and the back engaging portion of the hood is an engaging hole 21. The bump 19 is inserted into the engaging hole 21 so that the flap 20 is laid on the rear edge 22 of the engaging hole 21 and the same front engaging portion is used in this embodiment without any change to the first embodiment.

Figure 5:
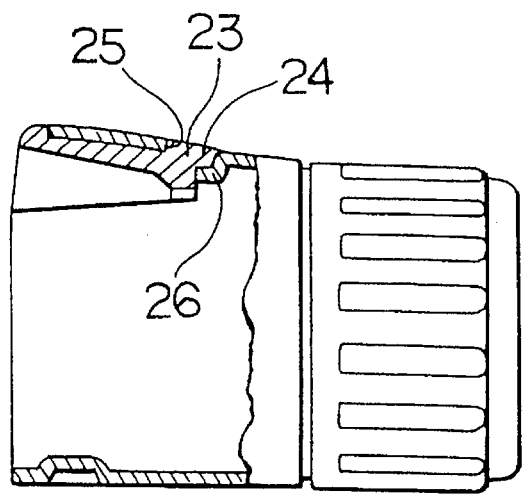
FIG. 5 is a longitudinal sectional view showing a fourth embodiment.

In a fourth embodiment shown in FIG. 5, the back engaging portion of the lining piece is a prominence 23 with its upper surface being a wing 24 extending rearwardly, and the back engaging portion of the hood is an opening 25 with an offset surface 26 extending from the back lower portion. With this structure, the back engaging portion of the lining piece is flush with the upper surface of the hood and the same front engaging portion is used in the same way as in the first embodiment.

Figure 6:
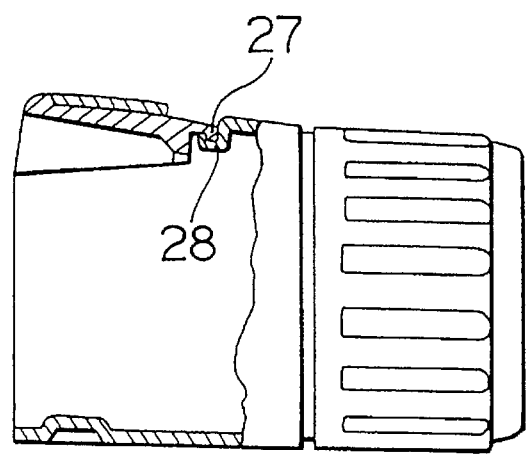
FIG. 6 is a longitudinal sectional view showing a fifth embodiment.
Figure 7:
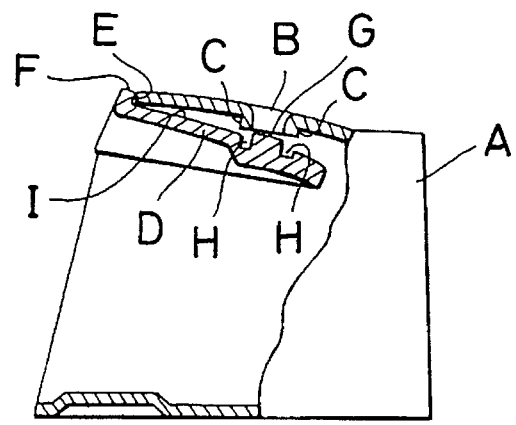
FIG. 7 is a longitudinal sectional view showing the prior art.

In a fifth embodiment shown in FIG. 6, the back engaging portion of the lining piece is an angled edge 27 bent downwardly, and the back engaging portion of the hood corresponding to this is a receiving groove portion 28 for receiving the angled edge 27 and the same front engaging portion is used in the same way as in the first embodiment.

The assembling operation for the second through fifth embodiments is almost the same as that of the first embodiment.

In the coupling means for the hood and the lining piece according to the present invention, the engaging portion of the lining piece mounted from below is rendered to ride on the top surface of the hood engaging portion. Accordingly, the lining piece is positively mounted on the hood inner surface to eliminate the fear of pull-off. Incidentally, the single back engaging portion is provided at the position on the top surface. Accordingly, the assembling is facilitated to considerably enhance the workability.

What is claimed is:

1. A reel seat for a fishing rod comprising:

a hood having a cylindrical sleeve portion into which a seat body is to be inserted;

a lining piece integrally mounted in the hood and fixed on an upper inner face of said cylindrical sleeve portion;

a cavity defined by said seat body and said lining piece into which a reel foot is to be inserted;

wherein said cylindrical sleeve portion comprises a bore formed on a back portion of the cylindrical sleeve portion, an inclined piece extending generally downwardly from a back edge of the bore, and a front engaging portion;

said lining piece comprises a back engaging portion which engages said inclined piece, and a front engaging portion which engages said front engaging portion of the cylindrical sleeve portion;

said front engaging portion of the cylindrical sleeve portion comprises a right step and a left step formed on the right and left sides of the front end of the cylindrical sleeve portion; said front engaging portion of the lining piece comprises a right bottom end and a left bottom end formed at the front end of the lining piece; and said right and left bottom ends engage said right and left steps, respectively.

2. A reel seat for a fishing rod comprising:

a hood having a cylindrical sleeve portion into which a seat body is to be inserted;

a lining piece integrally mounted in the hood and fixed on an upper inner face of said cylindrical sleeve portion;

a cavity defined by said seat body and said lining piece into which a reel foot is to be inserted;

wherein said cylindrical sleeve portion comprises a bore formed on a backportion of the cylindrical sleeve portion, an inclined piece extending generally downwardly from a back edge of the bore, and a front engaging portion;

said lining piece comprises a back engaging portion which engages said inclined piece, and a front engaging portion which engages said front engaging portion of the cylindrical sleeve portion;

said front engaging portion of the cylindrical sleeve portion comprises a right drill bore and a left drill bore; said front engaging portion of the lining piece comprises a right peg and a left peg; and said right and left pegs engage said right and left drill bores, respectively.

3. A reel seat for a fishing rod comprising:

a hood having a cylindrical sleeve portion into which a seat body is to be inserted;

a lining piece integrally mounted in the hood and fixed on an upper inner face of said cylindrical sleeve portion;

a cavity defined by said seat body and said lining piece into which a reel foot is to be inserted;

wherein said cylindrical sleeve portion comprises a bore formed on a back portion of the cylindrical sleeve portion, an inclined piece extending generally downwardly from a back edge of the bore, and a front engaging portion;

said lining piece comprises a back engaging portion which engages said inclined piece, and a front engaging portion which engages said front engaging portion of the cylindrical sleeve portion;

said inclined piece of the cylindrical sleeve portion further comprises an offset surface formed downwardly offset from the back edge of the bore; and said back engaging portion of the lining piece comprises a prominence portion having a wing formed to extend rearwardly from an upper surface of the prominence portion and which wing engages said offset surface.

* * * * *